(12) United States Patent
Junker et al.

(10) Patent No.: US 8,378,844 B2
(45) Date of Patent: Feb. 19, 2013

(54) UTILITY METER WITH EXTERNAL SIGNAL-POWERED TRANSCEIVER

(75) Inventors: John P. Junker, Lafayette, IN (US); Gordon R. Burns, West Lafayette, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 1406 days.

(21) Appl. No.: 11/490,645

(22) Filed: Jul. 21, 2006

(65) Prior Publication Data
US 2006/0261973 A1 Nov. 23, 2006

Related U.S. Application Data (63) Continuation of application No. 10/486,488, filed as application No. PCT/US02/29308 on Sep. 13, 2002, now Pat. No. 7,126,493.

(60) Provisional application No. 60/322,024, filed on Sep. 14, 2001.

(51) Int. Cl.
*G08B 23/00* (2006.01)
(52) U.S. Cl. .................. 340/870.02; 324/142
(58) Field of Classification Search ........... 340/870.01, 340/870.02, 870.3, 10.34; 324/142
See application file for complete search history.

(56) References Cited

U.S. PATENT DOCUMENTS

| 4,132,981 | A | * | 1/1979 | White | 340/870.02 |
| 4,782,341 | A | * | 11/1988 | Gray | 340/870.02 |
| 4,996,646 | A | | 2/1991 | Farrington | |
| 5,053,774 | A | | 10/1991 | Schuermann et al. | |
| 5,548,527 | A | | 8/1996 | Hemminger et al. | |
| 5,825,302 | A | | 10/1998 | Stafford | |
| 5,896,292 | A | | 4/1999 | Hosaka et al. | |
| 5,963,650 | A | | 10/1999 | Simionescu et al. | |
| 6,073,063 | A | | 6/2000 | Leong Ong et al. | |
| 6,087,957 | A | * | 7/2000 | Gray | 340/10.1 |
| 6,181,257 | B1 | * | 1/2001 | Meek et al. | 340/870.01 |
| 6,377,037 | B1 | | 4/2002 | Burns et al. | |
| 7,126,493 | B2 | * | 10/2006 | Junker et al. | 340/870.02 |

* cited by examiner

*Primary Examiner* — Albert Wong
(74) *Attorney, Agent, or Firm* — Maginot, Moore & Beck (57) ABSTRACT

An arrangement for use in a utility meter includes a non-volatile memory and an RF transceiver. The non-volatile memory has a first and a second port, the first port configured to obtain commodity consumption data. The radio frequency (RF) transceiver is configured to receive an RF signal from an external source and obtain energy from the RF signal and provide the energy to a bias voltage input of the non-volatile memory. The RF transceiver is further operable to perform a data transfer operation responsive to the received RF signal, the data transfer operation including a transfer of meter-related data between the non-volatile memory and the RF transceiver using the second port of the non-volatile memory.

10 Claims, 5 Drawing Sheets

UTILITY METER WITH EXTERNAL SIGNAL-POWERED TRANSCEIVER

This application is a continuation of U.S. application Ser. No. 10/486,488, filed Feb. 7, 2005 now U.S. Pat. No. 7,126,493; which is a national phase of PCT application no. PCT, US02/29308, filed Sep. 13, 2002, which claims priority form U.S. Provisional Application Ser. No. 60/322,024, filed Sep. 14, 2001.

FIELD OF THE INVENTION

The present invention relates generally to utility meters, and more particularly, utility meters having automated meter reading capability.

BACKGROUND OF THE INVENTION

Utility meters are devices the measure the consumption or flow of a commodity, such as gas, water or electricity. Traditionally, utility meters measured the consumption of a commodity by a facility, for example, a residence, factory, or commercial establishment. Other utility meters may measure the flow of a commodity out of a facility such as a power generation plant or a distribution network.

In general, however, utility meters measure commodity consumption and retain the commodity consumption data for use by the utility service provider. Commodity consumption data may include the quantity electrical energy consumed or the volume of gas or water consumed. The utility service provider uses the commodity consumption data to perform its billing function, among other things.

Many types of meters, including in particular electricity meters, employ electronic circuits to obtain and record consumption data. Electricity meters using such electronic circuits typically digital current and voltage signals, and then perform algebraic operations on the digitized signals to obtain energy consumption data. The energy consumption data is typically then displayed on a digital display.

Power for the electronic circuit is derived from the power lines being measured. As a result, no "external" source of power is necessary. Moreover, in the event of a power interruption, the resultant lack of power to the electronic circuit is inconsequential because there typically is no power consumption to measure. Accordingly, the model of an electricity meter that employs electronic measurement circuits that are powered by the mains power lines has been widely adopted.

One advantage of the use of electronic meters is that higher level data processing functions may be readily incorporated into the meter. For example, a single meter platform may readily be adapted to perform time-of-use metering, demand metering, or other types of metering with a simple software adjustment. Moreover, a single meter platform may readily be adapted for installation into various types of electrical wiring configurations (three wire delta, four wire delta, three wire wye and four wire wye) through the use of software changes.

To this end, meters typically include the facility to receive meter program data (e.g. program parameters) externally after the manufacture of the meter. For example, many meters include optical port through which meter parameters and meter calibration data may be externally loaded into the meter. In such meters, a non-volatile memory such as an electrically erasable programmable read-only memory ("EEPROM") is used to store the programmed values. Non-volatile memory is employed to ensure that the programmed data remains within the meter after power is removed from the meter for shipment to the customer.

The advantage of using adjustable program parameters stored in EEPROM in the meter is that the manufacturer may produce a single meter that is adaptable to large numbers of various customer configurations. As a result, large numbers of different meters need not be inventoried. Instead, one type of meter is inventoried, and then may be programmed to suit customer orders as they are received.

While the above-described process facilitates configuration of many meter features and operations after manufacture of the meter is substantially complete, it nevertheless requires significant time and equipment. In particular, storing operational parameters into the meter requires that electrical power be available in the meter in order to carry out the programming task. Thus, for example, if several meters must be "programmed" to fulfill a specific customer request, all of the meters must be connected to electrical power as well as to the programming device.

Accordingly, there is a need for a method and apparatus that further facilitates configuration of a meter that requires a reduced amount of time and equipment. Such a method and apparatus would ultimately provide greater flexibility and/or less cost in configuring meters for different applications.

SUMMARY OF THE INVENTION

The present invention fulfills the above need, as well as others, by providing a meter that includes a transceiver that is operable to receive external signals, derive bias power from the external signals, and perform a data transfer operation in a nonvolatile memory in the meter using the bias power. Thus, for example, such a meter could be used to receive external signals that include meter program (parameter) data, and store the parameter data in the nonvolatile memory without requiring the meter to be hooked up to the mains electrical power. In other words, the external programming signal itself provides the power within the meter to store the programming information. Such a meter could also, in other embodiments, be read out even when the mains power is unavailable by having the meter measurement circuit store consumption data within the nonvolatile memory during normal operation. Then, if the mains power is interrupted at the time a technician arrives to read the meter, an external signal may be used to power the retrieval of the consumption data.

One embodiment of the invention is an arrangement for use in a utility meter that includes a non-volatile memory and an RF transceiver. The non-volatile memory has a first and a second port, the first port configured to obtain commodity consumption data. The radio frequency (RF) transceiver is configured to receive an RF signal from an external source and obtain energy from the RF signal and provide the energy to a bias voltage input of the non-volatile memory. The RF transceiver is further operable to perform a data transfer operation responsive to the received RF signal, the data transfer operation including a transfer of meter-related data between the non-volatile memory and the RF transceiver using the second port of the non-volatile memory.

In another embodiment of the arrangement for use in a utility meter, the transceiver is operable to receive external signals from an external source and obtain bias power and first meter data from the external signals. The transceiver is further operable to transmit outgoing signals to the external source, the outgoing signals containing second meter data. The non-volatile memory has a first and a second port. The first port is configured to provide first meter data to a measurement circuit of the utility meter and to receive second meter data from the measurement circuit and the second port is operable to receive first meter data from the transceiver and provide second meter data to the transceiver. The non-volatile memory also has a bias voltage input operably coupled to receive the bias power from the transceiver.

The above described features and advantages, as well as others, will be readily apparent to those of ordinary skill in the art by reference to the following detailed description and accompanying drawings.

DETAILED DESCRIPTION

Figure 1:
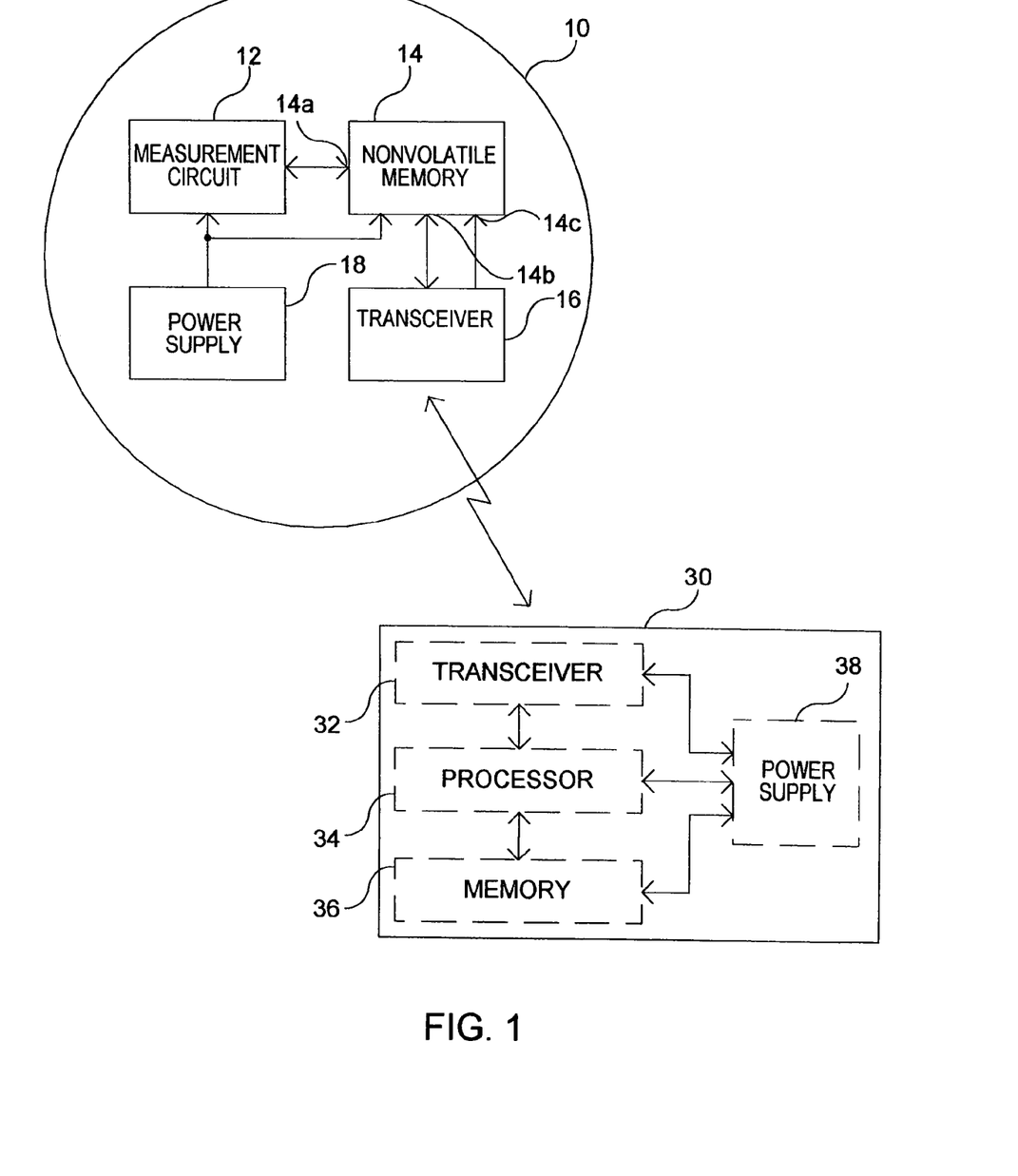
FIG. 1 shows an exemplary commodity consumption meter according to the present invention and an exemplary external device for use therewith.

FIG. 1 shows an exemplary commodity consumption meter 10 according to the present invention and an exemplary external device 30 for use therewith. In general the external device 30 communicates data to and/or from the commodity consumption meter 10. The external device 30 further provides signals to the commodity consumption meter 10 from which elements within the meter 10 derive power for effecting data communication operations.

To this end, the commodity consumption meter 10 includes a measurement circuit 12, a non-volatile memory 14, a power supply 16, and a transceiver 18. It will be appreciated that the commodity consumption meter 10 may optionally include other devices such as other communication circuitry, an electronic or mechanical display, and other peripheral devices commonly available in commodity meters.

The exemplary external device 30 includes a transceiver 32, a processor 34, a memory 36 and a power supply 38. The external device 30 may comprise a portable "laptop" personal computer, or a specially-designed computing device.

Referring specifically to the commodity consumption meter 10, the measurement circuit 12 is a circuit that generates commodity consumption data. The commodity consumption data may be in the form of digital signals, such those as used within processing circuitry, or may include pulses representative of a particular quantity of commodity consumed. For example, in water and gas meters, circuitry connected to flow metering devices generate pulse signals, each of which represents a certain amount of flow. Such devices are well known, and are discussed, for example in U.S. Pat. No. 4,132,981, which is incorporated herein by reference. In electricity meters, the measurement circuit 12 may include one or more processing devices that calculate energy consumption data from measured current and voltage signals. Measurement circuits used in electricity, gas and water metering are known in the art.

The non-volatile memory 14 is a memory device that retains data even in the absence of electrical bias power. Thus, the non-volatile memory 14 is preferably an electrically erasable programmable read-only memory ("EEPROM"). However, the non-volatile memory 14 may alternatively be a FRAM device available from RAMTRON, Colorado Springs, Colo. The non-volatile memory 14 is operably coupled to communicate data to and/or from the measurement circuit 12.

Preferably, the non-volatile memory 14 is operable to communicate data to and from the measurement circuit 12 as well: as to and from the meter transceiver 16. To this end, the non-volatile memory includes multiple communication ports, specifically a first port 14a coupled to the measurement circuit and a second port 14b coupled to the meter transceiver 16.

The power supply 18 is a device that generates bias power for the measurement circuit 12. In one example, the power supply 18 may be connected to the mains electrical power lines and generate bias power for the measurement circuit therefrom 18. However, the power supply 18 may alternatively derive power from batteries, light sources or the like. In accordance with embodiments of the present invention, the power supply 18 provides the power necessary to allow data communication between the measurement circuit 12 and the non-volatile memory 14.

The meter transceiver 16 is a transceiver circuit that is configured to receive a signal from an external source, obtain energy from the signal, and convert the energy to bias power for use by the non-volatile memory 14. To this end, the meter transceiver 16 is connected to a bias power input 14c of the non-volatile memory 14. In addition, the meter transceiver 16 is operable to perform a data transfer operation responsive to the signal, the data transfer operation including a transfer of first data between the non-volatile memory 14 and the meter transceiver 16 using the second port 14b of the non-volatile memory 14.

The data transfer operation may include the transfer of control or program data received within the external signal to the non-volatile memory 14 for subsequent use by the measurement circuit 12. Because the meter transceiver 16 obtains and uses the energy in the external signal, the data transfer operation within the meter 10 may be accomplished even if the power supply 18 is disconnected or otherwise cannot generate bias power. Alternatively, or in addition, the data transfer operation may include the transfer of commodity consumption or other data from the non-volatile memory 14 to the transceiver 16. In such a case, the transceiver 16 preferable employs the energy from the external signal to provide power for transmitting an outgoing signal, as will be discussed further below.

Preferably, the transceiver is an RF transceiver, and thus is operable to perform the above-described functions upon receiving an RF signal. To this end, the transceiver 16 may suitably be the RF transceiver and associated analog circuitry of an RFID device. RFID devices are known devices that derive operational power from a received RF signal. The RFID devices are configured to transmit a response signal using the power from the received RF signal. One suitable device, the model AT24RF08C available from Atmel Corporation of San Jose, Calif. includes both the transceiver 16 and the non-volatile memory 14.

In an alternative embodiment, the transceiver may be an inductive coupler such as that shown in U.S. Pat. No. 4,132,981, which is incorporated herein by reference. Although the use of the inductive coupler does not have many of the advantages of the present invention, such a device would benefit from the use of the multiple port memory that allows data transfer both to and from the measurement circuit 12 and to and from the transceiver 16.

Referring now specifically to the external device 30, the transceiver 32 is a device that is operable to transmit external signals to the meter transceiver 16. The external signals contain energy that may be obtained by the receiving meter transceiver 16. To this end, the transceiver 32 is operably connected to the power supply 38 to receive transmission power therefrom. Transceivers operable to communicate with RFID devices are known. Accordingly, in the event that the meter transceiver 16 is a part of an RFID device, the transceiver 32 would take a corresponding form. In the event that the meter transceiver 16 is an inductive coupling device such as that shown in U.S. Pat. No. 4,132,981, the transceiver 32 would take that corresponding form.

The processor 34 is any processing circuit that is operable to process data received via the transceiver 32. In addition, the processor 34 is operable to generate (or transfer from memory 36) data to be transmitted by the transceiver 32. The memory 36 is operable to store data to be transmitted to one or more meters, and also operable to store data received from one or more meters.

In general, the external device 30 is used to exchange data with the commodity consumption meter 10 in a manner that does not require the commodity consumption meter 10 to utilize an independent source of bias power.

Figure 2:
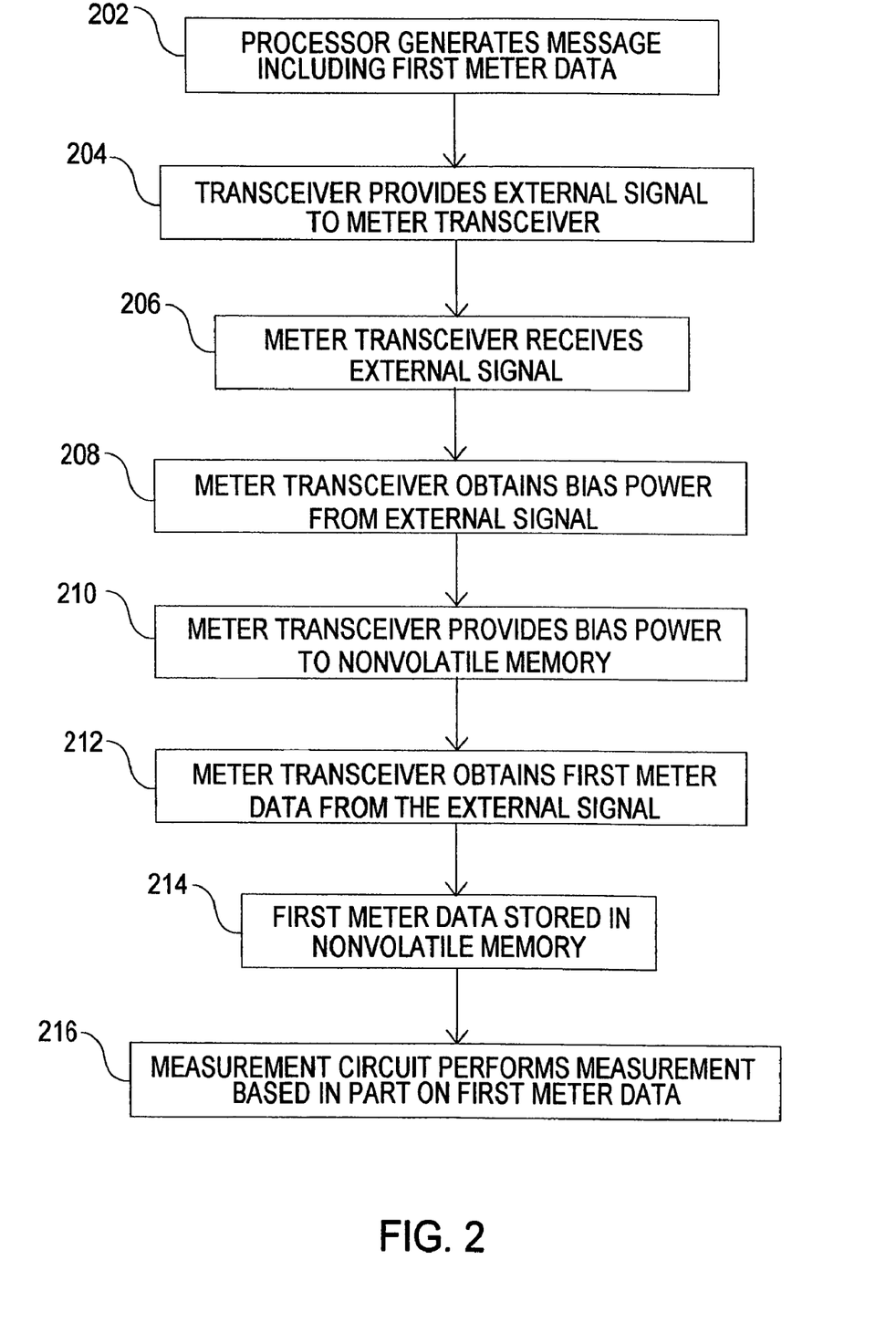
FIG. 2 shows a flow diagram of the operations of the external device and commodity consumption meter of FIG. 1 in accordance with one exemplary method according to the present invention.

FIG. 2 shows a flow diagram of a first exemplary operation of the commodity consumption meter 10 and the external device 30 in accordance with one aspect of the present invention. In the operation illustrated in FIG. 2, the external device 30 provides first meter data to the meter 10 in the form of meter control data, which may suitable include operational parameters, calibration information, or program data. Operational parameters and/or program data may be installation specific data that is programmed into the meters to accommodate a particular customer order. Operational parameters may define the types of options enabled within the measurement circuitry 12, the types of quantities measured, statistical data retained by the meter 10, or other parameters. Calibration information may include data used to correct for measured variances in the measurement circuitry 12. Finally, program data may be used to change the way the meter performs its basic calculations. For example, in electricity metering, different mathematical energy calculations are required for different meter installations. To accommodate such differences, the program data within the meter 10 may be changed. U.S. Pat. No. 5,548,527, which is incorporated herein by reference, shows an exemplary meter having a field changeable meter program.

Referring now to the flow diagram 200, the operations of FIG. 2 may be carried out in a factory or distribution center setting, and without wiring the meter 10 to any external power source. Alternatively, the operations of FIG. 2 may be carried out in a customer's facility, or after installation.

In step 202 the processor 34 of the external device 30 generates a message that includes the first meter data to be communicated to the commodity consumption meter 10. To this end, the processor 34 may obtain the first meter data from the memory 36. The first meter data may be entered into the memory 36 via a user interface, not shown, a storage media drive, not shown, a communication port, not shown, or through the transceiver 32 from another device, not shown. In any event, the first meter data preferably includes control data for the meter 10, as discussed above.

After step 202, the transceiver 32 in step 204 provides an external signal to the meter transceiver 16, the external signal containing the message generated by the processor 34. In the exemplary embodiment in which the transceiver 32 is an RF transceiver, the transceiver 32 modulates the message onto an RF carrier having a frequency within the tuning frequency of the meter transceiver 16. The external device 30 is preferably within the general proximity of the meter 10 to increase the signal power detected by the meter transceiver 16.

Thereafter, in step 206, the meter transceiver 16 receives the external signal. In step 208, the meter transceiver 16 obtains energy/bias power from the received signal. The meter transceiver 16 employs the energy to power its own operations, and in step 210, further provides bias power to the non-volatile memory 14. The meter transceiver 16 also, in step 212, obtains the first meter data from the external signal. RFID circuits, such as the model AT24RF08C from Atmel, have suitable circuitry for obtaining a digital signal from a received RF signal. Likewise, U.S. Pat. No. 4,132,981 shows circuitry for obtaining data from an inductively coupled signal.

The meter transceiver 16 in step 214 stores the first meter data in the non-volatile memory 14. To this end, the meter transceiver 16 provides the first meter data to the second port 14b of the non-volatile memory 14. The bias power for the operation of step 214, as discussed above, is derived from the received external signal. Steps 202 through 214 may thus be carried out in the absence of bias power from the power supply 18. Accordingly, steps 202 through 214 may be carried out prior to installation of the meter 10, or when the power supply 18 is otherwise non-operational.

At a subsequent point in time, the measurement circuit 12 begins (or resumes) performing commodity consumption measurements to generate the commodity consumption data. The measurement circuit 12 then in step 216 retrieves the first meter data from the non-volatile memory 14 and then performs one or more measurements based in part on the first meter data. For example, if the first meter data includes a metering parameter, then the measurement circuit 12 performs one or more subsequent measurements based at least in part on the received parameter. If the first meter data is calibration information, then the measurement circuit 12 performs subsequent measurements using an adjustment based on the received calibration information. If the first meter data is program information, then the measurement circuit 12 performs different operations in subsequent measurements based on the received program information.

Thus, the ongoing normal operations of the meter may be altered, changed or configured using the above described operations regardless of whether the power supply 18 is available, and in some cases, regardless of whether the meter 10 even includes a power supply 18. One advantage of the present invention is that the metering information may be provided to the meter 10 prior to connection or installation of the meter 10. As a result, aspects of metering operation may be altered even if it is not convenient to connect up the meter. Another advantage is that communication with the meter 10 may take place during a power outage in the electrical mains.

Figure 3:
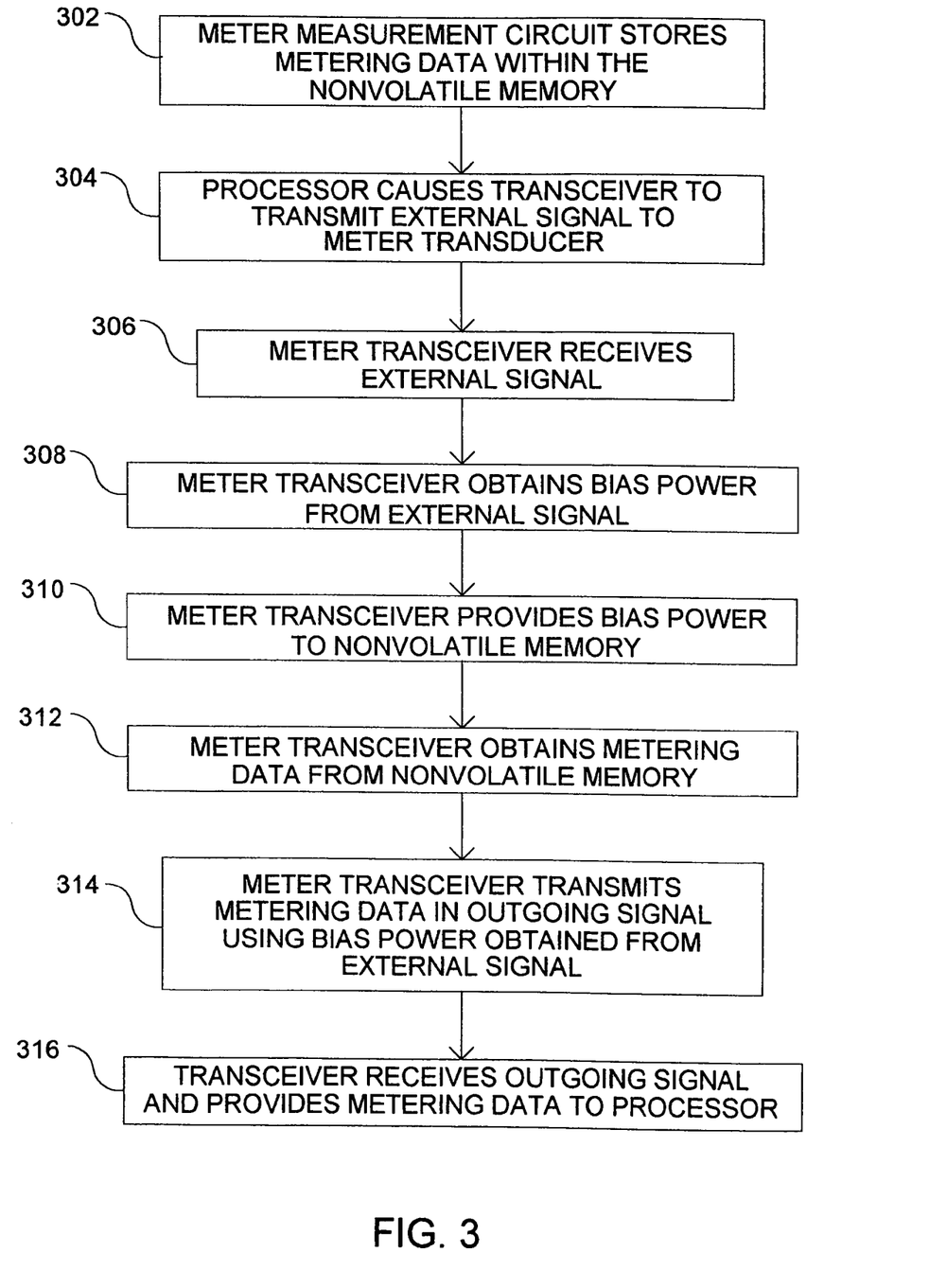
FIG. 3 shows a flow diagram of the operations of the of the external device and commodity consumption meter of FIG. 1 in accordance with one exemplary method according to the present invention.

FIG. 3 shows an exemplary operation in which second meter data is communicated from the meter 10 to the external device 30 using energy derived from an external signal generated by the external device. In such an operation, the external device 30 may "read" commodity consumption data in the event of a power outage, or obtain meter statistics or other metering information without requiring electrical power to the meter 10.

In step 302, the measurement circuit 12 from time to time stores metering data within the nonvolatile memory 14. To this end, the measurement circuit 12 transfers the metering data to the nonvolatile memory 14 through the first port 14a. Preferably, the metering data includes commodity consumption data. Commodity consumption data may include a value representative of accumulated electrical energy, gas, or water units consumed, or information regarding periods of highest demand. Commodity consumption data may include statistical information related to the commodity consumed. Other types of metering data may include diagnostic alarm data, power quality data, or other data relevant to the meter. The measurement circuit 12 preferably stores metering data which 1) may need to be communicated occasionally or in the event of a power outage and/or 2) should be retained in the event of a power outage. A "power outage" means a time in which the power supply 18 cannot provide bias power to the various circuits.

Periodically, a technician, customer, or other person obtains the metering data from the non-volatile memory 14 via the external device 30. The request for data may be key into the external device 30 or otherwise entered into the external device 30 using known interface means, not shown.

To this end, in step 304, the processor 34 of the external device 30 causes the transceiver 32 to transmit an external signal that is adapted to be received by the meter transceiver 16. In some embodiments, it may be preferably for the processor 34 to generate a message indicative of a "read" request, and then cause the message to inserted into the external signal. The "read" request is adapted to be processed by the meter transceiver 16 to identify that the some or all of the contents of the non-volatile memory are intended to be read out. In other embodiments, mere reception of the external signal by the meter transceiver 16 causes the meter transceiver to read out the contents of the non-volatile memory 14.

In step 306, the meter transceiver 16 receives the external signal. At about the same time, in step 308, the meter transceiver 16 obtains bias power from the external signal. The meter transceiver 16 thereafter in step 310, provides the bias power to the non-volatile memory 14. After the nonvolatile memory has bias power, the meter transceiver 16 obtains at least some of the metering data from the non-volatile memory 14 in step 312.

Thereafter, in step 314, the meter transceiver 16 transmits the metering data in an outgoing signal. To this end, the meter transceiver 16 employs the bias power derived from the received external signal.

After transmission of the outgoing signal, the transceiver 32 of the external device 30 receives the outgoing signal and provides the metering data contained therein to the processor 34 in step 316. The processor 34 may thereafter store the metering data in the memory 36, display the metering data on a display, not shown, or store the metering data on a removable storage device, not shown.

In any event, after step 316, the metering data stored within the non-volatile memory 14 of the meter 10 has been retrieved, all without requiring the power supply 18 to provide any bias power. As a result, metering data may be retrieved from electricity meters even if mains electrical power is not available. The steps of FIG. 3 may further be employed in a water or gas meter that stores metering data in a non-volatile memory using powered pulses, such as is taught in U.S. Pat. No. 4,132,981, discussed above.

Figure 4:
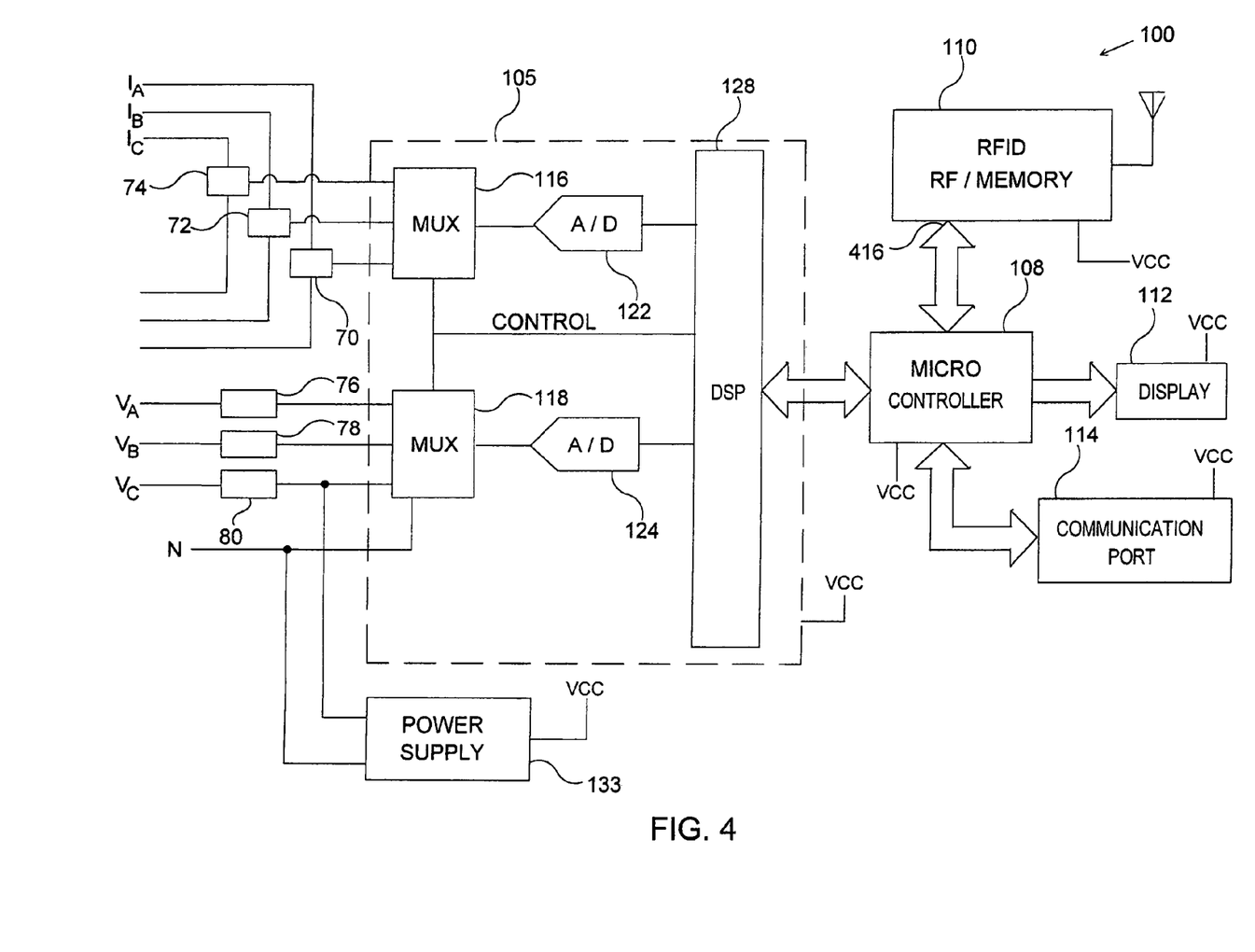
FIG. 4 shows an exemplary electricity meter according to the present invention.

FIG. 4 shows an exemplary electricity meter 100 according to the present invention. The electricity meter 100 shows in further detail one example of the meter 10 shown in FIG. 1.

Referring now to FIG. 4, a schematic diagram of an exemplary meter suitable for practicing the present invention is shown. For purposes of explanation and example only, the meter of FIG. 4 is shown as an electrical utility meter for monitoring three-phase electrical power. However, the principles of the present invention are applicable to other types of meters, electrical meters and otherwise, in which it may be beneficial to communicate data generated by a measurement device to an external device in the absence of electrical power within the meter.

In FIG. 4, the exemplary meter 100 is a meter intended to, among other things, measure power consumption by a load, not shown, connected to an electric utility, not shown. As will be described herein, the overall function of the meter 100 is controlled by two processing devices. Because processing devices control the meter functions, the operations of the meter 100 may be altered by adjusting programs, parameters, calibration values used by the processing devices. As will be discussed below, the meter 100 includes a circuit that allows adjustment of the programs, parameters, and calibration values even when the meter 100 is not connected to power lines.

The exemplary meter 100 includes polyphase current sensors 70, 72 and 74 and polyphase voltage sensors 76, 78 and 80. The meter 100 further includes a conversion circuit 105, a processor or microcontroller 108, an RF/memory circuit 110, a display 112, and a communication port 114. The conversion circuit 105 comprises a first multiplexer 116, a second multiplexer 118, a first analog-to-digital ("A/D") converter 122, a second A/D converter 124, and a digital signal processor ("DSP") 128. It will be noted that a three-phase electrical utility meter is given by way of example only. Those of ordinary skill in the art may readily adapt the inventive aspects of present invention to other types of meters, such as single phase or network meters.

The meter 100 further includes a power supply 133 that is configured to generate bias power for the conversion circuit 105, the controller 108, the RF/memory circuit 110, the display 112, and the communication port 114. Such a power supply 133 may suitably be a switched mode power supply circuit that converts line voltage received from one of the mains electrical power lines to suitable DC bias voltages. Such circuits are known.

The current sensors 70; 72 and 74 are each connected to receive signals indicative of the current flowing through one phase of a three phase power line (i.e., phase A, phase B, and phase C). The current sensors 70, 72 and 74 of the exemplary embodiment described herein preferably each include transformers (not shown in FIG. 4), which are advantageously situated to detect current on each respective phase of the power line. The current sensors 70, 72 and 74 are further connected to the conversion circuit 105 through the first multiplexer 116.

The voltage sensors 76, 78 and 80 are each connected to the respective phase of the power line (i.e., phase A, phase B, and phase C) to obtain a voltage measurement therefrom. To this end, the voltage sensors 76, 78 and 80 may suitably comprise high resistance voltage dividers. Alternatively, the voltage sensors 76, 78 and 80 may be potential transformers. The voltage sensors 76, 78 and 80 are further connected to the conversion circuit 105 through the second multiplexer 118.

The conversion circuit 105 is a circuit operable to receive polyphase voltage and polyphase current measurement signals and generate digital signals therefrom, the digital signals including a power consumption signal and voltage and current signals. In the exemplary embodiment described herein, the conversion circuit 105 comprises first and second multiplexers 116 and 118, respectively, the first and second A/Ds 122 and 124, respectively, and the DSP 128. The above listed components of the conversion circuit 105 may suitably be incorporated onto a single semiconductor substrate. Such devices are well known and examples of suitable devices are described in U.S. Pat. No. 6,112,158, which is incorporated herein by reference.

The controller 108 is operably configured to, and executes programming instructions to, receive the digital signals from the conversion circuit 105, monitor and record power consumption using the digital signals, and analyze the digital voltage and current measurement signals and associated phase angle data to determine whether one or more measurement errors is present. The controller 108 may suitably be a K0 series microcontroller available from NEC. However, the controller 108 may alternatively comprise any other suitable processing device or circuit. The controller 108 generally includes firmware, or in other words, an integrated memory into which programming instructions are stored. Alternatively, the programming instructions may be stored in the RF/memory 110.

Figure 5:
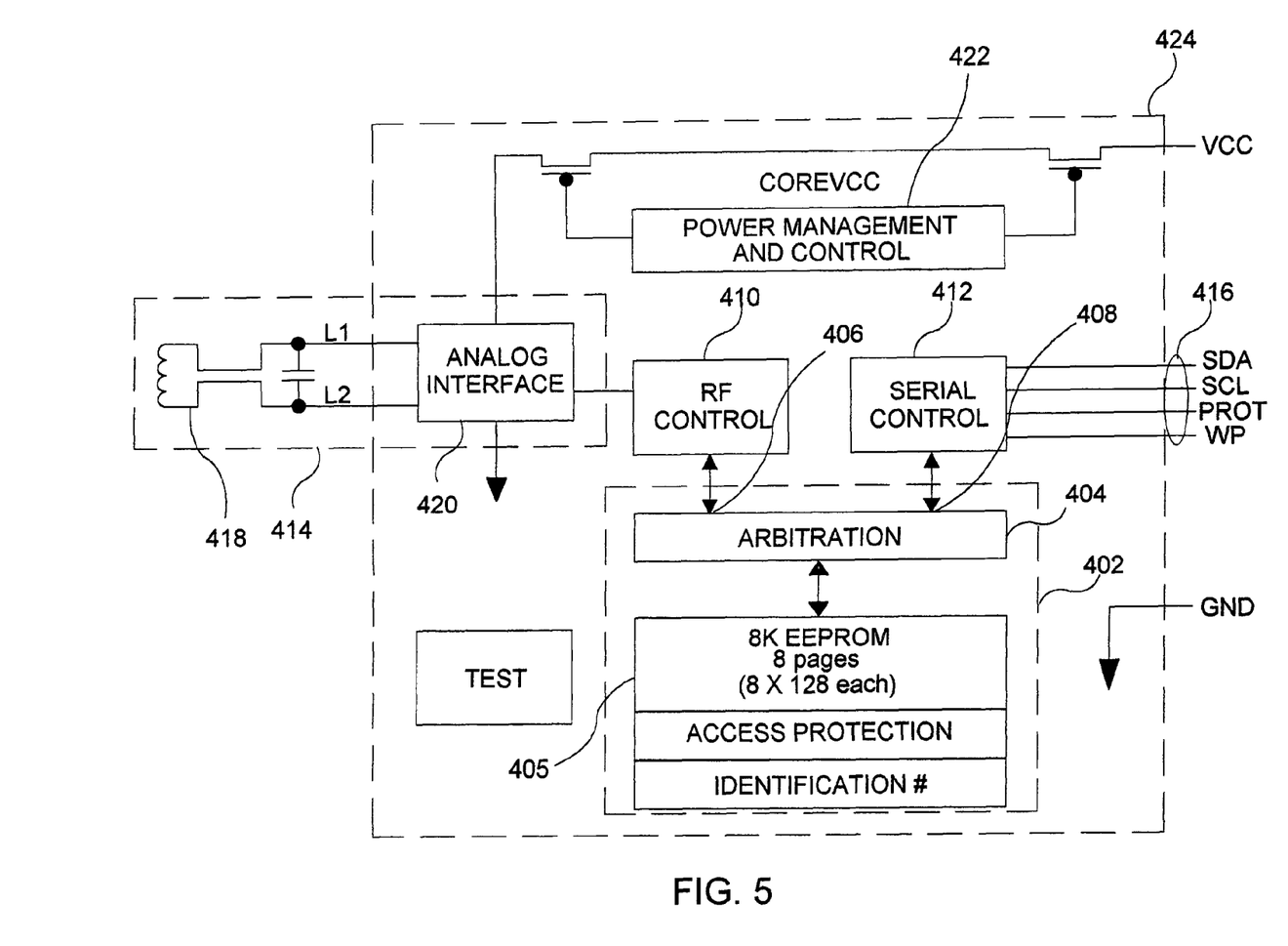
FIG. 5 shows an exemplary embodiment of an RF transceiver, non-volatile memory and associated elements employed in the electricity meter of FIG. 4 in accordance with the present invention.

The RF/memory 110 is a combination RF transceiver and dual port memory device, sometimes known in the art as an RFID device. A suitable exemplary device is the model AT24RF08C available from Atmel Corporation of San Jose, Calif. FIG. 5 shows a block diagram of an exemplary embodiment of the an RFID device.

Referring now to FIG. 5, the exemplary RF/memory 110 includes an EEPROM circuit 402 that includes an arbitration circuit 404 and an 8K EEPROM 405. The 8K EEPROM is composed of eight 1K pages, each page comprising eight blocks of 128 bytes. The arbitration circuit 404 provides controlled access to the 8K EEPROM 405 via two ports 406 and 408. The first port 406 is connected to an RF control block 410 and the second port 408 is connected to a serial control block 412. The RF control block 410 is interposed between the RF transceiver 414 and the first port 406 of the EEPROM circuit 402. The serial control block 412 is interposed between a standard serial data bus port 416 and the second port 408.

The RF transceiver 414 includes an coil circuit 418 and an analog interface circuit 420. The coil circuit 418 is operable to receive RF signals and provides the RF signals to the analog interface 420. The analog interface 420 is operable to demodulate the digital data transmitted within a received RF signal. The analog interface 420 is further operable to obtain bias energy from the received RF signal and provide the obtained energy to a power control circuit 422. The power control circuit 422 is further operable connected to a power supply input 424.

Further detail regarding the exemplary RF/memory 110 of FIG. 5 is provided in The ATMEL Asset Identification EEPROM AT24RF08C (product description), publication "Rev. 1072E-09/99", (Atmel Corporation, 1999), which is incorporated herein by reference.

In a preferred embodiment, the EEPROM circuit 402 operates to store program data, parameter data, calibration data, and energy consumption data in a non-volatile manner. Access to such data by the controller 108 is provided through the serial bus 416 (see also FIG. 4). External access to the data is provided through the RF transceiver 414. The RF transceiver 414 in the exemplary embodiment described herein communicates using 125 kHz carrier signals. Other frequencies may suitably be used. The entire RF/memory 110 may operate using bias power from the meter power supply 133 or using bias power obtained from a received RF signal, as will be discussed below.

In the general operation of the meter 100, the controller 108 performs initial configuration operations upon a start-up or reset mode. The reset mode typically is triggered by a power-up condition, such as when the meter 100 is initially installed, or following an interruption in the mains electrical power. As part of the reset mode operations, the controller 108 obtains program data and provides it to a memory, not shown, such as a random access memory, associated with the DSP 128. The controller may receive the program data from an internal memory, an auxiliary non-volatile memory or mask memory, not shown, or the RF/memory 110. The DSP 128 then performs operations based at least in part on the program data transferred to the memory by the controller 108.

Such program data may alternative be permanently stored in mask memory or the like that is directly connected to the DSP 128. In such a case, the controller 108 would not need to transfer the data from the EEPROM circuit 402 to the DSP 128. However, because the energy calculation algorithm can vary from meter installation to meter installation (four wire wye vs. three wire delta), it is useful to store the energy calculation program instructions within EEPROM circuit 402 (see FIG. 5) of the RF/memory 110 to allow for changing the installation of the meter 100.

The program data may include an energy calculation algorithm carried out by the DSP 128 such as, for example, ENERGY=$V_A I_A + V_B I_B + V_C I_C$, which is described below in further detail. As will be discussed below the energy calculation algorithm ENERGY=$V_A I_A + V_B I_B + V_C I_C$ is appropriate for four wire wye installations, which is the exemplary embodiment described herein.

The controller 108 may also obtain calibration constants from the EEPROM circuit 402. In particular, it is well known that current sensors such as current sensors 70, 72 and 74 (and sometimes voltage sensors) introduce some error into measurement signals. By performing calibration operations oh the meter 100, the error can be fairly well approximated and thus compensated. Methods of determining and applying compensations in utility meters are varied and well known. The calibration compensation is preferably applied within the conversion circuit 105.

In particular, two common types of compensations, scaling and delay, are used to compensate for measurement magnitude and phase errors, respectively. Such scaling and delay factors are readily implemented on a per-phase basis within the conversion circuit 105, as is known to those of ordinary skill in the art. In particular, sample delay may be introduced into the voltage and/or current sample stream, such as is taught in U.S. Pat. No. 6,377,037, which is incorporated herein by reference, in order to compensate for phase error. Scaling may be used to scale digital current and/or voltage values to compensate for any magnitude errors introduced by the sensors. The compensation factors used to carry out the compensation are typically stored in the EEPROM circuit 402 to ensure that they are not lost in the event of a power interruption.

Finally, the controller 108 may obtain options/parameters from the EEPROM circuit 402. Increasingly, electricity meters can determine a variety of quantities ranging from watt-hours to VAR-hours, RMS voltage and current, harmonic content, and various statistics. As a result, the type of metering data obtained, stored, displayed and communicated may vary widely from meter to meter. Programmable parameters in the EEPROM circuit 402 may be used to identify, for each individual meters, the types of quantities that are obtained, stored displayed and/or communicated. In this manner, customers of meters (e.g. utilities, consumers, or energy distribution entities) may configure the meters to suit their own particular needs.

Thus, the EEPROM circuit 402 in the exemplary embodiment described herein includes several types of metering data for which it is useful to provide the flexibility of external, self-powered programmability.

In normal metering operations, the current sensors 70, 72 and 74 detect the phase A current, the phase B current, and the phase C current, respectively, and generate current measurement signals therefrom. The current sensors 70, 72 and 74 may suitably generate the three phase measurement signals contemporaneously and continuously. The current sensors 70, 72 and 74 provide the phase A, phase B and phase C measurement signals, respectively, to the first multiplexer 116. The current measurement signals typically have a voltage level that is indicative of the instantaneous current level on their respective phases. For current transformers designed for utility meter use, the current measurement signals measure from approximately 0.0 volts to 0.3 volts maximum. Other scaling factors may of course be employed.

The first multiplexer 116, under the control of the controller 108, then provides the instantaneous current measurement signals for phase A, phase B, and phase C to the first A/D converter 122. The first multiplexer 116 typically provides each signal in a rapid succession of cycles, such that each signal is provided to the first A/D converter 122 every third cycle. According to the exemplary embodiment described herein, the first multiplexer 116 provides these signals to the first A/D converter 122 at a rate of 2721 Hz.

The first A/D converter 122 receives and samples or digitizes the rapid succession of signals provided by the first multiplexer 116. The first A/D converter 122 then provides to the DSP 128 a stream of digital words, each representing the magnitude of one of the three phase currents at a particular instant.

Contemporaneously, the voltage sensors 76, 78 and 80 detect the phase A voltage, the phase B voltage, and the phase C voltage, respectively, and generate voltage measurement signals therefrom. The voltage sensors 76, 78 and 80 provide the phase A voltage measurement signal, the phase B voltage measurement signal, and the phase C voltage measurement signal, respectively, to the second multiplexer 118. Each voltage measurement signal is typically a signal having a voltage level that is indicative of the instantaneous voltage level on its respective phase. In the exemplary embodiment described herein, the voltage sensors 76, 78 and 80 are configured to provide voltage measurement signals that range from approximately 0.0 volts to 0.3 volts maximum. Other scaling factors may of course be employed.

The second multiplexer 118 provides the output signal from the phase voltage measurement signals in a rapid succession of sequences, such that each signal is provided to the second A/D converter 124 every third step of the sequence. According to the exemplary embodiment described herein,: the second multiplexer 118 provides the signals at the same rate as that used by the first multiplexer 116 to provide signals to the first A/D converter 122. Moreover, the first multiplexer 116 and the second multiplexer 118 operate in a coordinated fashion to provide certain phase current measurement signals at the same time as certain phase voltage measurement signals. For example, in a four wire wye meter wiring configuration, the first multiplexer 116 provides the phase x current measurement signal and the second multiplexer 118 provides the phase x voltage measurement signal contemporaneously, where x rotates among A, B and C.

The second A/D converter 124 receives and samples or digitizes the rapid succession of signals provided by the second multiplexer 118. The second A/D converter 124 then provides to the DSP 128 a stream of digital words or samples, each representing the magnitude of one of the three phase voltages at a particular instant. The first A/D converter 122 and the second A/D converter 124 thus provide to the DSP 128 the digital current and voltage measurement signals in a predetermined synchronous relationship.

The DSP 128 within the conversion circuit 105 determines power consumption by selectively multiplying the digital voltage measurement signal samples and the digital current measurement signal samples received from the A/D converters 122 and 124, and then adding them together.

In particular, in a four wire wye meter wiring configuration, the appropriate power calculation is:

$$\text{ENERGY} = V_A I_A + V_B I_B + V_C I_C \quad (1)$$

The DSP 128 carries out the above calculation in the manner described hereinafter. The DSP 128 receives from the A/D converters 122 and 124 a digital current measurement signal sample and a digital voltage measurement signal sample, respectively (e.g., for phase A). The DSP 128 then multiplies the current and voltage measurement signal samples, and the resulting product is added to a running total or sum. The DSP 128 then receives the next set of digital current and voltage measurement signal samples (e.g., for phase B), and repeats the foregoing process. In other words, if $\text{DIG\_VOLT}_x$ is the digital voltage measurement signal for a phase x and $\text{DIG\_CURR}_x$ is the adjusted digital current measurement signal for the phase x, then the DSP 128 carries out the following calculation:

$$\text{ENERGY} = \text{SUM}\,(\text{DIG\_VOLT}_x * \text{DIG\_CURR}_x)\text{ for } x = \{A, B, C, A, B, \ldots\} \quad (2)$$

From time to time, the DSP 128 provides power consumption data derived from POWER to the controller 108.

The controller 108 accumulates the power consumption data until a predefined watt-hour threshold has been reached. At that point, the controller 108 generates a power consumption pulse and increments a power consumption counter. The power consumption counter is the number by which customer power consumption is tracked. For example, as is well known, a utility may determine a particular customer's consumption for a particular billing cycle by subtracting the power consumption counter value at the beginning of the billing cycle from the power consumption counter value at the end of the billing cycle. The controller 108 preferably provides the power consumption counter information to both the RF/memory 110 and the display 112. The display 112 then provides a visual representation of the power consumption counter information from which readings may be taken by utility personnel. The RF/memory 110 stores the power consumption counter information for the purposes of retention in the case of a power interruption.

Optionally, the controller 108 further provides the power consumption counter information, as well as other information, to the communication circuit 114. The communication circuit 114 may then communicate the information over an external communication means, such as a public telephone network, to a central processing facility for the utility. In this manner, the utility may track and bill for power consumption registered by the meter 100 without requiring an employee to physically view the meter.

The controller 108 also generally controls the operation of the conversion circuit 105, and particularly, the first and second multiplexers 116 and 118, respectively, the first and second A/D converters 122 and 124, respectively, and the DSP 128. To assist in controlling such devices, the controller 108 periodically, or at least during initialization or reset, downloads meter control information or data from the EEPROM circuit 402 of the RF/memory 110, as discussed further above.

For example, the controller 108 may download program code from the EEPROM 402 for use by the DSP 128. The program code may define the exact power calculation employed by the DSP to generate the value ENERGY. The controller 108 may also download calibration information, such as the delay and scaling compensation factors which may be employed by various elements of the conversion circuit 105 to compensate for sensor and other error.

In addition to metering power consumption, the DSP 128 also determines and provides other information to the controller 108. In particular, the DSP 128 provides for each phase, the measured voltage magnitude and phase angle data, and the measured current magnitude and phase angle data. To determine the measured voltage and current magnitude data, the DSP 128 performs an RMS calculation on each digital voltage measurement signal and each adjusted current measurement signal. This calculation may for example, include, for each phase voltage and current, squaring each sample of the digital measurement signal, and taking the mean of the squared samples over time.

To determine phase angles for each voltage, the DSP 128 uses the time differences between the zero crossings of the phase voltage signals. The time difference between the zero crossing of a particular signal $V_x$ and the $V_A$ signal, plus the direction of the respective zero crossings, provides the phase information. Current phase information is determined using watts per phase and VAR per phase. In particular, a current phase angle for phase x is given by arctan ($VAR_x/WATTS_x$).

The DSP 128 provides the measured voltage and current magnitude and phase angle data to the controller 108. Table 1, below shows the measured values so provided.

TABLE 1

$VRMS_A$ = Phase A voltage magnitude
$VRMS_B$ = Phase B voltage magnitude
$VRMS_C$ = Phase C voltage magnitude
$IRMS_A$ = Phase A current magnitude
$IRMS_B$ = Phase B current magnitude
$IRMS_C$ = Phase C current magnitude
$V\angle_A$ = Phase A voltage phase angle
$V\angle_B$ = Phase B voltage phase angle
$V\angle_C$ = Phase C voltage phase angle
$I\angle_A$ = Phase A current phase angle
$I\angle_B$ = Phase B current phase angle
$I\angle_C$ = Phase C current phase angle It is noted that the controller 108 may be required to perform some further conversion on the measured data to put it in the form identified in Table 1.

The controller 108 may use the information received from the DSP to further generate and store other metering information, such as the highest demand periods, the energy usage data over multiple time periods (also known as load profiling), diagnostic information, harmonic content, and other voltage, current and energy values and statistics. Those of ordinary skill in the art could readily generate such quantities using the values provided by the DSP 128 described above. Such information may readily be stored in the RF/memory 110 (EEPROM circuit 402) from time to time. To this end, the controller 108 provides the metering data or information to the serial data bus port 416 of the RF/memory 110. (See FIGS. 4 and 5). The serial data bus port 416 provides the data to the second port 408 via the serial control block 412.

The controller 108 may further determine what additional information should be provided to the display 112 for display. The controller 108 also determines what metering information should be communicated via the communication port 114 as well as when communications should occur.

The controller 108 may determine what metering data to generate, store, display and/or communicate in accordance with user parameters stored within the EEPROM 402. Such flexibility allows a single meter design to be configurable in a multitude of ways, allowing each customer or user to customize the operation of their meter. To obtain the parameters, the controller 108 obtains the data from second port 408 of the EEPROM 402 through the serial control block 412 and the serial data bus port 416.

One of the advantages of storing meter control data, such as program data, calibration data and parameter data, in the RF/memory 110 is that such data may be downloaded to the meter 100 even when the meter 100 is disconnected from any source of electrical power. To this end, the meter control data may be communicated from an external device to the RF/memory 110 in the manner described generally above in connection with FIG. 2.

In one exemplary operation, the meter control data is communicated to the EEPROM 402 before the meter 100 is connected to the power lines. Before the meter 100 is connected to the power lines, the power supply 133 does not generate any bias power for use by the circuits of FIG. 4 or 5. In such operation, the RF/memory 110 receives RF signals that include the meter control information. In practice, the RF signals may include a number of other communication signals, for example handshaking/identification signals, that precedes the actual meter control information. The RF signals are received by coil circuit 418 and provided to the analog interface 420. The analog interface 420 obtains signal energy from the received signal and provides the signal energy to power control circuit 422. The power control circuit 422 generates bias power for the EEPROM circuit 402 using the received signal energy.

The analog interface 420 and RF control block 410 further cooperate to provide the meter control data from the received signal to the EEPROM circuit 402. In particular, the RF control block 410 provides the meter control data to the first port 406 of the EEPROM circuit 402. The data propagates through the first port 406 to the arbitration circuit 404. If the second port 408 is not accessing the 8K EEPROM 405, then the meter control data may proceed immediately to the 8K EEPROM 405. If, however, the second port is currently accessing the 8K EEPROM 405, then the arbitration circuit 404 will delay access to the 8K EEPROM 405 via the first port 406.

If the arbitration circuit 404 permits the meter control data to propagate through the the 8K EEPROM 405, then the meter control data is stored in the 8K EEPROM 405 any suitable manner.

All of the above operations may occur when the meter is disconnected because the received RF signal powers all of the above described operations. The controller 10 may subsequently access the meter control data either upon power-up or during subsequent normal operation of the meter 100. To this end, the controller 108 obtains the data from the second port 408 through the serial control block 412 and the serial data bus port 416.

Another advantage of the RF/memory 110 of FIGS. 4 and 5 is that it allows for information to be retrieved from the meter 100 when the meter 100 lacks bias power from the power supply 133. Such a condition may occur if a meter reading is attempted during an interruption of electrical service. In addition, many remote and/or rural sites employ meters connected to power mains that are routinely disconnected as a means of shutting down equipment. For example, an oil derrick may include a remote power disconnect that also disconnects a meter intended to measure consumption by the oil derrick. In such cases, utility personnel attempting to obtain a meter reading would have hitherto been prevented if the meter reading was attempted while the remote power disconnect was in the disconnected state. However, in accordance with one aspect of the present invention, data may be obtained from a meter even when no electrical power is provided to the meter.

To this end, the controller 108 and RF/memory 110 operate substantially as described above in connection with FIG. 3. In particular, the RF/memory 110 receives an RF signal from an external device. The RF signal generally includes some indication that it represents a request for metering data, and preferably an indication identifying the type of metering data requested. As discussed above, the RF signals may further include other communication signals, such as handshaking/identification signals.

In any event, the RF signals are received by coil circuit 418 and provided to the analog interface 420. The analog interface 420 obtains signal energy from the received signal and provides the signal energy to power control circuit 422. The power control circuit 422 generates bias power for the EEPROM 402 from the received signal energy. The analog interface 420 and RF control block 410 cooperate to provide digital signals to the EEPROM 402 that are configured to obtain the data requested therefrom. If the arbitration circuit 404 determines that the 8K EEPROM 405 may be accessed, the digital signals are provided that cause the 8K EEPROM 405 to provide the stored metering data to the RF control block 410. The RF control block 410, analog interface 420 and coil circuit 418 cooperate to generate an RF output signal that includes the requested metering data from the 8K EEPROM 405. The power for the transmission is derived from the incoming RF signal.

Accordingly, the above circuit operates to receive an RF signal requesting metering data and transmit the requested data in an outgoing RF signal using the power from the received RF signal. Moreover, the circuitry necessary to obtain data from the 8K EEPROM 405 in which the data is stored is also powered by the received RF signal. As a consequence, metering data may be obtained from a meter that otherwise is not connected to a source of electrical power.

It will be appreciated that the above described embodiments are merely illustrative, and that those of ordinary skill in the art may readily devise their own implementations that incorporate the principles of the present invention and fall within the spirit and scope thereof.

We claim:

1. A method comprising:
    a) receiving an external signal into a transceiver of a utility meter;
    b) obtaining first bias power from the external signal;
    c) obtaining first meter data from the external signal;
    d) providing the first bias power to a non-volatile memory;
    e) storing the first meter data into the non-volatile memory; and
    f) performing commodity consumption measurements within the utility meter based at least in part on the first meter data.

2. The method of claim 1, further comprising, prior to step f):
    providing second bias power from a source other than the external signal to the non-volatile memory; and
    retrieving the first meter data from the non-volatile memory.

3. The method of claim 1, further comprising:
    g) storing second meter data into the non-volatile memory, wherein the second meter data is at least partially different than the first meter data.

4. The method of claim 3, further comprising:
    h) receiving a second external signal into the transceiver;
    i) obtaining first bias power from the second external signal;
    j) providing the first bias power to the non-volatile memory;
    k) retrieving the second meter data from the non-volatile memory;
    l) transmitting an outgoing signal to a device external to the utility meter, said outgoing signal including the second meter data.

5. The method of claim 1 wherein step a) further comprises receiving the external signal into the transceiver of the utility meter, the external signal comprising an RF signal.

6. The method of claim 1 wherein step c) further comprises obtaining the first meter data from the external signal, the first meter data including meter calibration data.

7. The method of claim 1 wherein step c) further comprises obtaining the first meter data from the external signal, the first meter data including meter program data.

8. A method comprising:
    a) measuring commodity consumption at least in part using a circuit within a utility meter, the circuit powered by a first source of electrical power;
    b) storing consumption data measured by the circuit in a non-volatile memory, the storage in the non-volatile memory powered by the first source of electrical power;
    c) receiving an external RF signal into a transceiver within the utility meter when the first source of electrical power is unavailable;
    d) obtaining bias power from the external RF signal;
    e) providing the bias power to the non-volatile memory;
    f) retrieving meter-related data from the non-volatile memory;
    g) transmitting an outgoing signal to a device external to the utility meter, said outgoing signal including the meter-related data.

9. The method of claim 8 wherein step g) further comprises employing an RF transmitter to transmit the outgoing signal.

10. The method of claim 8 further comprising, prior to step a), receiving into the nonvolatile memory meter-related data comprising commodity consumption data from a measurement circuit of the utility meter.

* * * * *